(No Model.) 2 Sheets—Sheet 1.
J. P. WICK.
CANDY MACHINE.
No. 296,901. Patented Apr. 15, 1884.
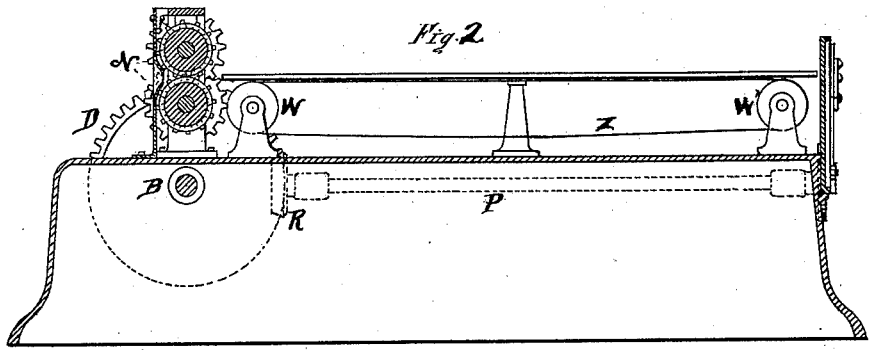
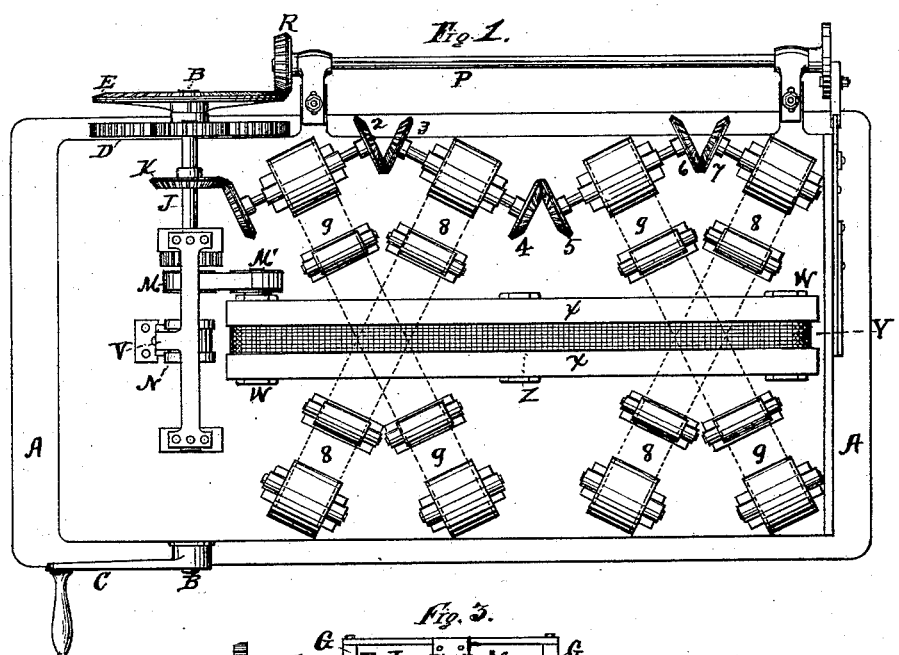
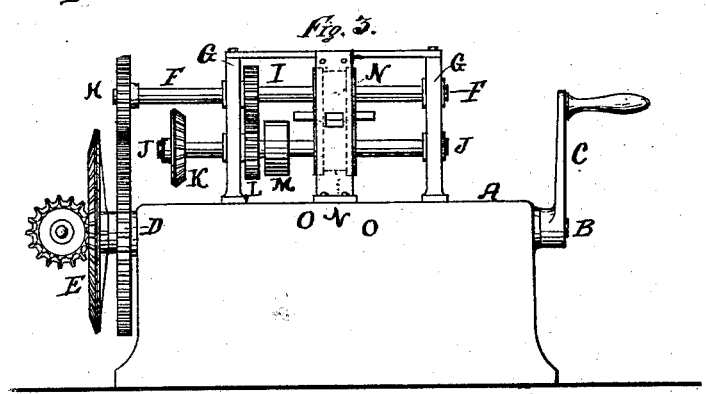
WITNESSES: John P. Wick, INVENTOR,
By Geo. E. Tracy & Co.
ATTORNEYS (No Model.) 2 Sheets—Sheet 2.

J. P. WICK.
CANDY MACHINE.

No. 296,901. Patented Apr. 15, 1884.

WITNESSES,

John P. Wick,
INVENTOR,
By Geo. E. Tracy & Co.
ATTORNEYS.

UNITED STATES PATENT OFFICE.

JOHN P. WICK, OF CLEVELAND, OHIO.

CANDY-MACHINE.

SPECIFICATION forming part of Letters Patent No. 296,901, dated April 15, 1884.

Application filed November 6, 1883. (No model.)

*To all whom it may concern:*

Be it known that I, JOHN P. WICK, of Cleveland, county of Cuyahoga, and State of Ohio, have invented a new and Improved Candy-Machine; and I do hereby declare that the following is a full, clear, and exact description of the same, reference being had to the accompanying drawings, and to letters of reference marked thereon.

My invention relates to certain new and useful improvements in devices for manufacturing candies, and relates more particularly to that class of candies known as "stick-candy." The rolling of this kind of candy is commonly done by hand, and it is my intention to perform the necessary work by means of suitable mechanical contrivances in a neat, rapid, and efficient manner. This device is illustrated in the accompanying drawings, in which—

Figure 4:
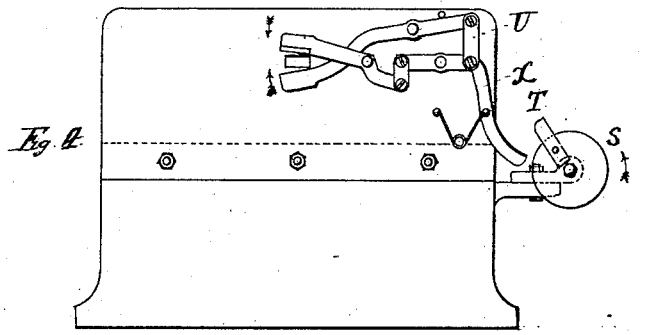
Figure 5:
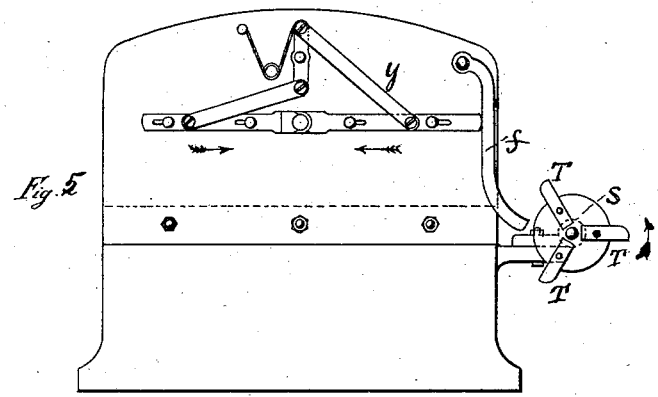
Figure 6:
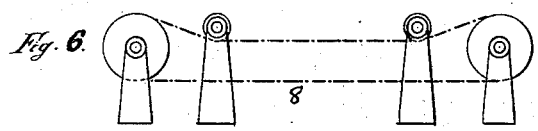
Figure 7:
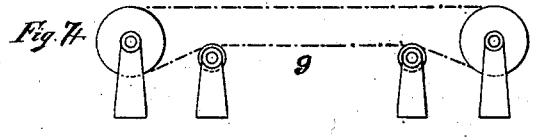

Figure 1 is a plan or top view of my invention, showing all the working parts. Fig. 2 is a vertical longitudinal section on the line $v$ $v$. Fig. 3 is a front end view, showing elevation and arrangement of the gears, shafts, &c. Fig. 4 is a rear end view, showing arrangement for cutting off short pieces of candy—such as kisses, caramels, &c.—from sticks having a square or oblong section. Fig. 5 is another rear view, showing arrangement for cutting off longer pieces of round stick-candy. Figs. 6 and 7 are side views of pulleys and belts or fillets for twisting and forming round sticks of striped or variegated candy.

A, Fig. 1, is a bench or table, on which the apparatus stands.

B is a shaft mounted on suitable journals and boxes, extending across the machine, carrying gear-wheels D E, and fitted with a crank or winch, $e'$. This crank may be replaced by a gear-wheel or pulley for the application of steam or other power when hand-work is dispensed with.

F is a shaft parallel with B, and supported above it on standards G G, and carrying gear-wheels H I. J is another shaft, also parallel with and above shaft B. This shaft also is supported by standards G G, and carries spur-gear L, bevel-wheel K, and pulley M.

N N is a pair of feed-rolls on shafts F and J, and working behind adjustable guide-plates O O.

P is a shaft bracketed on side of A, as shown in Fig. 1, and fitted with bevel-pinion R, gearing with bevel-wheel E. The outer end of P is armed with a face-plate, S, for the attachment at pleasure of tappets or arms I I, as shown in Figs. 4 and 5.

U is a pair of double-jointed shears for cutting off candy, having an extension, U', for the working of the same through the agency of tappets I I. Y is another form of shears or cut-off, designed for cutting into lengths round sticks of candy. These are worked in a similar manner to U.

W W' are a pair of rollers supported on suitable standards, the shaft of W being prolonged for the reception of pulley M', which is geared with pulley M by a belt, as shown in Fig. 1.

Z is an endless web or belt passing round pulleys W and W', and designed as a carrier for the parcels of candy as they are being formed into sticks or cylinders, suitable provision being made for maintaining a proper tension on said belt to prevent slipping; X X, guide-pieces, forming a channel for keeping in place the fillets of candy in passing through the machine. They can be removed or adjusted at pleasure, or ice or cold water troughs substituted; or they may be used in connection therewith, at the pleasure of the operator, the ice or cold water being used for cooling the candy when required.

8 8 8 8 are four groups of driving and guide pulleys, to be fitted with suitable endless belts or webs, as indicated by dotted lines in Fig. 1. 9 9 9 9 are similar groups of pulleys fitted with belts, as indicated. By referring to Figs. 6 and 7 it will be seen that the belts of groups 8 pass under the guide-pulleys, while those of 9 pass over the guides, thus carrying the belts alternately above and below the stick of candy, by which it is given a twisting rotary movement, forming it into a perfect round by the time it reaches the point of delivery. The shafts of four of these driving-pulleys on one side of the machine are prolonged for the reception of the beveled gears 1, 2, 3, 4, 5, 6, and 7, all gearing with each other, the whole being driven by wheel K, which can be put out or in gear (having a limited longitudinal movement for that purpose) at the pleasure of the operator. This arrangement is clearly shown in Fig. 1.

The working of this machine is very easily understood. By turning crank C to the right, motion will be given to gear B and D, which will at once be transferred to shafts P, F, and J and their connecting gears and belts, and all parts of the machine will be in active operation. If now a suitable mass of candy be presented to feed-rolls N, it will be drawn through the guides O, delivered to endless belt Z, which is moving to the right, and in its progress be brought under the forming or rolling action of belts 8 and 9, and finally thrust through the openings in rear plate, where it is cut into the desired length by the action of cutters W or Y, and fall into suitable receptacles below. It will be understood that a funnel or other shaped mouth-piece or feeder may be placed, when required, in front of feed-rolls N N, through which the parcels of candy may be drawn for the purpose of giving them form and proportions required.

Having thus described my invention, what I claim, and desire to secure by Letters Patent, is—

1. The combination of the rollers 8 8 9 9, belts 8 8 9 9, channels or guides X X, and cutters W and Y, as and for the purpose set forth and described.

2. The hollow groove or channel formed by guides X X and belt Z, constructed in the manner and for the purposes set forth and described.

3. The belts or webs moving over the groups of rollers or pulleys 8 8 9 9, and designed to impart a rotary progressive movement to the stick of candy within the guides X X, substantially in the manner and for the purposes set forth and described.

This specification signed and witnessed this 27th day of August, 1883.

JOHN P. WICK.

Witnesses:
GEO. C. TRACY,
AUG. G. ILY.